S. W. RIFE.
SHOCK ABSORBER.
APPLICATION FILED MAY 17, 1911.
1,029,462.
Patented June 11, 1912.
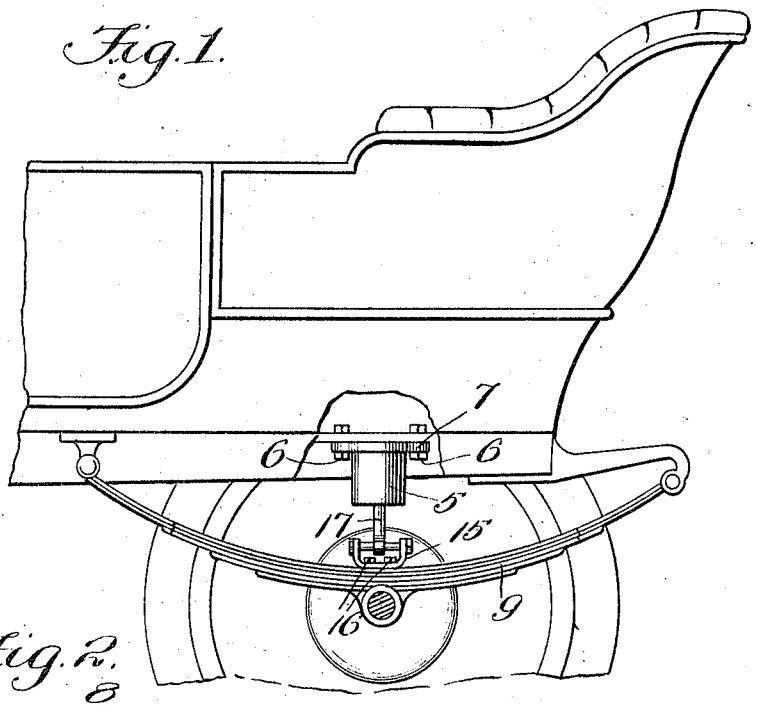
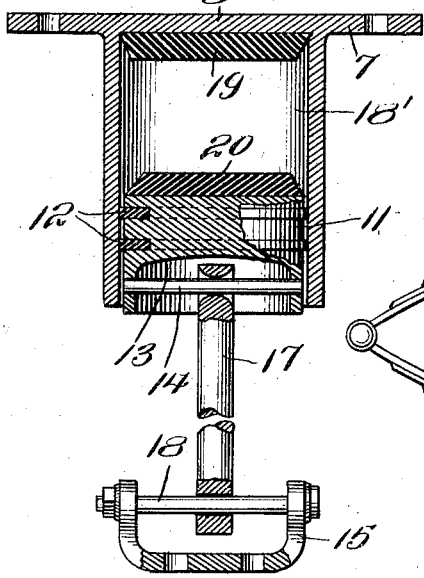
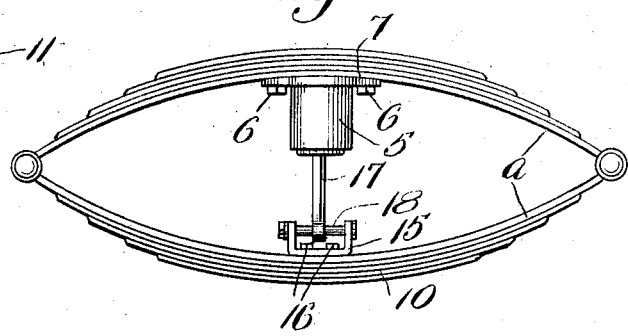
WITNESSES:
J. L. Wright
John Ardusgay
INVENTOR
Stanford Walton Rife
BY
Victor J. Evans,
ATTORNEY

UNITED STATES PATENT OFFICE.

STANFORD WALTON RIFE, OF SAN MARCOS, TEXAS.

SHOCK-ABSORBER.

1,029,462.

Specification of Letters Patent. Patented June 11, 1912.

Application filed May 17, 1911. Serial No. 627,723.

*To all whom it may concern:*

Be it known that I, STANFORD WALTON RIFE, citizen of the United States, residing at San Marcos, in the county of Hays and State of Texas, have invented new and useful Improvements in Shock-Absorbers, of which the following is a specification.

The object of the invention is to increase the efficiency of shock absorbers by permitting of bodily movement on one of the parts to which these devices are usually connected.

To this end the invention consists in securing a cylinder to one side of an elliptical spring, or to the vehicle proper when semi-elliptical springs are employed, and pivotally and slidingly connecting one end of a piston rod to one side of the spring or to the vehicle, as the case may be, the opposite end of the rod being similarly connected to a piston working against an air cushion in the cylinder.

With the above structure other objects are included which will appear and be better understood from the following description taken in connection with the accompanying drawings in which:

Figure 1 illustrates a side view of my device as applied to a motor vehicle; Fig. 2 is a vertical sectional view of the same; Fig. 3 is a detail side elevation of an elliptical spring showing my device applied thereto.

Similar numerals of reference are employed designating corresponding parts throughout.

As shown in Figs. 1 and 3 the cylinder 5 is secured at one end by suitable securing means such as bolts 6 which extend through a flange 7 on the closed end 8 of the cylinder 5. Although I have shown the cylinder inverted, it is to be understood that I am not to be limited to this arrangement since the cylinder may be arranged upright in which event it would be secured to the spring 9 in Fig. 1 and to the lower side 10 of the spring *a* in Fig. 3. The piston 11 reciprocates in the cylinder 5 and a substantially air tight joint is effected by means of the rings 12 carried by the piston 11. The lower end of the piston has a concave depression 13 and a wrist pin 14 is secured at opposite points adjacent to the open end of the depression 13. A yoke 15 is fastened in any preferred manner such as by bolts 16 to the spring 9 in Fig. 1 or to the lower side 10 of the spring *a* in Fig. 3. When the cylinder is upright however as before described this yoke will, of course, be secured to the vehicle proper or the upper side of the spring *a* as the case may be. A connecting rod 17 has one end adapted to turn and slide on the wrist pin 14 and its opposite end is similarly adapted to turn and slide on a pin 18 which connects the ends of the yoke 15.

By referring to Fig. 2 it will be seen that, when the parts are in their normal positions a space 18' will be provided between the inner end of the piston 11 and the head 8 of the cylinder. Within this space an air cushion is provided against which the piston 11 works when the body of the vehicle and spring 9 or the opposite sides of the spring 10 move relatively to each other when the vehicle is passing over humps or ruts. This will be further manifest when it is remembered that the piston 11 fits tightly within the cylinder 5 so that when the wheels pass over uneven places on the road and the cylinder and piston move relatively to each other the air will be compressed in the space 18' before the air can be forced between the cylinder and side of the piston. Whatever air is forced between the piston and cylinder will, however, form a thin film there around which will prevent friction and on rebound this air which tends to escape from the cylinder around the piston will be sucked into the cylinder by the outward movement of the piston.

In case the wheels suddenly strike an obstacle thereby creating a most violent and extraordinary compression of air in the cylinder and forcing the piston into engagement with the head 8 it is evident that the jar will be very perceptible to the occupants of the vehicle unless some means are provided for absorbing the same. Therefore, in order to accomplish this absorbing result I provide rubber cushions 19 and 20, the former being secured to the inner face of the head 8 and the latter to the inner end of the piston 11.

It will be seen that owing to the peculiar mounting of the rod 17, the body of the vehicle will be permitted to move laterally and longitudinally without producing a lateral stress on the said rod.

Although I have shown and described a preferred and modified form of my device it is to be understood that I am not to be limited to the structures shown and described, since various changes may be made within the scope of the claim without departing from the spirit of the invention.

What is claimed as new is:

In combination with two relatively movable members including the frame and body of a vehicle; of a shock absorber including a cylinder connected to one of the members, a piston in the cylinder and having a cupped end, a bearing rod extending transversely of and arranged in the cupped end, a bearing rod connected to the other of said members, and a piston rod adapted for turning and bodily sliding movements on said bearing rods.

In testimony whereof I affix my signature in presence of two witnesses.

STANFORD WALTON RIFE.

Witnesses:
W. A. SCRUTCHIN,
J. R. WILHELM.

Copies of this patent may be obtained for five cents each, by addressing the "Commissioner of Patents, Washington, D. C."